I. O. DENMAN.
REFRACTING TELESCOPIC GOGGLES.
APPLICATION FILED FEB. 7, 1910.
988,081.
Patented Mar. 28, 1911.
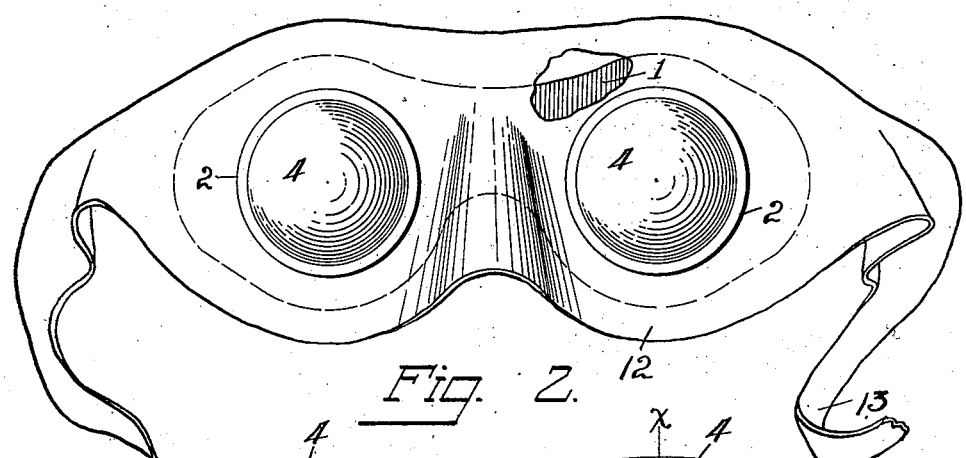
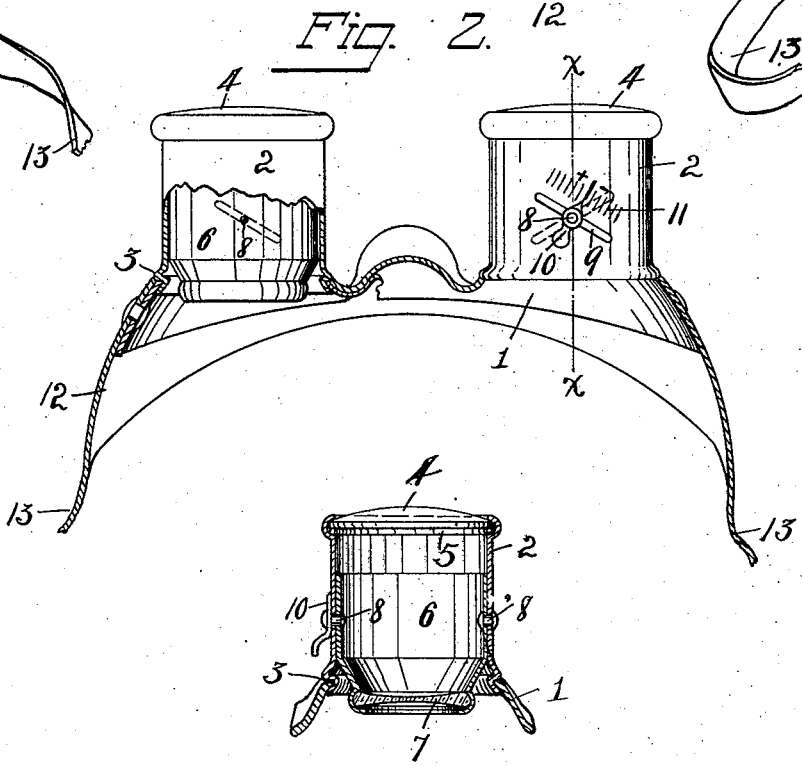
WITNESSES:
C. H. Bills
E. E. Thomas
INVENTOR.
Ira O. Denman,
By Owen & Owen
His attys.

UNITED STATES PATENT OFFICE.

IRA O. DENMAN, OF TOLEDO, OHIO, ASSIGNOR OF ONE-HALF TO THOMAS A. DE VILBISS, OF TOLEDO, OHIO.

REFRACTING TELESCOPIC GOGGLES.

988,081. Specification of Letters Patent. Patented Mar. 28, 1911.

Application filed February 7, 1910. Serial No. 542,521.

*To all whom it may concern:*

Be it known that I, IRA O. DENMAN, a citizen of the United States, and a resident of Toledo, in the county of Lucas and State of Ohio, have invented a certain new and useful Refracting Telescopic Goggle; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to optical instruments, and more particularly to telescopic goggles of the class especially intended for use in automobile riding, but is not restricted to such use as they may be used in any connection for which they may be adapted or appropriate.

The object of my invention is the provision of a goggle of the class described, which is particularly applicable for use as a protection for the eyes in automobile riding, and which is adapted to have the separate telescopic parts thereof individually adjustable by persons unskilled in the art to correct refractive errors of vision, whereby persons required to wear glasses to correct such errors of vision can obtain the same result by a substitution of my goggles therefor and in addition obtain the advantages of a telescopic instrument.

The invention is fully described in the following specification, and a preferred embodiment of the same illustrated in the accompanying drawings, in which,—

Figure 1 is a front view of a goggle embodying my invention with a portion broken away. Fig. 2 is a top view thereof with a portion in central section, and Fig. 3 is a section on the line $x\ x$ in Fig. 2.

Referring to the drawings, 1 designates the body of the goggle, which is formed of metal or other suitable material of a firm nature, and is suitably fashioned as indicated to adapt it to extend across the face in front of the eyes and to rest upon the nose. This body is provided in advance of each eye with an opening in which the inner end portion of a barrel 2 is fixedly secured, as indicated at 3, or in any other suitable manner. In the outer end of each barrel 2 is mounted an objective lens 4, which is shown in the present instance as being secured against movement therein by expanding the end portion of the barrel to form a seat therefor and then rolling its edge over the outer edge of the lens, a spring ring 5 being used in conjunction with the barrel to hold the lens in position. A second or inner barrel 6 is fitted within each barrel 2 for longitudinal adjustment and is shown as having its outer end, or that which is adjacent the inner end of the barrel contracted and fashioned in a suitable manner to carry the inner or eye-piece lens 7 of the telescope, this lens being usually of smaller diameter than the outer or objective lens 4 and of concave form.

To provide a simple and efficient means for individually adjusting the lenses of each set of barrels, or, in other words, of each telescope or vision portion, the inner barrel 6 has studs 8, 8 projecting from opposite sides thereof through registering slots 9 in the outer barrel 2. These slots are spirally disposed and inclined in opposite directions, as indicated by the full and dotted lines at the right of Fig. 2, whereby a turning of the barrel 6 within the barrel 2 will effect a positive relative longitudinal adjustment of the two barrels and a consequent contraction or retraction of the associated lenses 4, 7, as is apparent. On one of the studs 8 of each set is mounted an index-finger, or pointer, 10, which also serves as a finger piece to facilitate an adjustment of the telescoping barrels. The finger 10 registers with a series of graduations 11 on the barrel 2 at one side of the associated slot 9 to indicate a neutral point of adjustment and a plurality of points of adjustment each for plus and minus requirements for correcting refractive errors in the vision. It is apparent with this arrangement that it is a very simple matter for a person, whose refractive vision is incorrect and knowing the prescription for correcting the same, to adjust the lenses of each telescope to correct such error, and thus be able to use the goggles in lieu of his glasses and receive the additional benefit of the far seeing feature of a telescope. For instance, should the prescription to correct a refractive error in the vision for one eye be "minus one" and for the other "plus two," a person knowing the same can quickly move the index-finger of the respective telescopes to register with the proper plus or minus designations on the scales.

12 designates a covering of leather, or other suitable material, for the body 1 and is represented as projecting beyond the edge of the body to adapt it to closely hug the face to exclude dust from the eyes, and terminates at the ends of the body in straps 13, 13 for encircling the head to retain the goggles in position on the face.

It is thus evident that I have provided a goggle particularly adapted for the needs of automobilists or the like, which shields the eyes from dust and dirt, enables objects to be distinctly seen at long distances, which alone is of inestimable value to automobilists, and has the different telescopes or vision parts thereof individually adjustable to enable refractive errors of vision to be corrected in an easy and simple manner.

I wish it understood that my invention is not limited to any specific construction or arrangement of the parts, except in so far as such limitations are specified in the claim.

Having thus described my invention, what I claim as new and desire to secure by Letters Patent, is,—

A goggle having a body plate, vision barrels carried in fixed relation by such plate, the outer end portions of the said barrels being expanded to form a seat, a lens carried by each seat, a spring ring arranged within the seat below each lens for holding the latter in position, a second barrel telescoping within each fixed barrel for longitudinal adjustment therein, a lens carried by each of the second mentioned barrels, and a dust-guard carried by the body plate and provided with head encircling straps.

In testimony whereof I have hereunto signed my name to this specification in the presence of two subscribing witnesses.

IRA O. DENMAN.

Witnesses:
C. W. OWEN,
ANNA MARKS.